United States Patent [19]

Haisma et al.

[11] Patent Number: 5,580,407
[45] Date of Patent: Dec. 3, 1996

[54] METHOD OF BONDING TWO OBJECTS, AT LEAST ONE OF WHICH COMPRISES ORGANIC MATERIALS

[75] Inventors: Jan Haisma; Franciscus J. H. M. Van Der Kruis; Gijsbertus A. C. M. Spierings, all of Eindhoven, Netherlands

[73] Assignee: U.S. Philips Corporation, New York, N.Y.

[21] Appl. No.: 275,178

[22] Filed: Jul. 13, 1994

[30] Foreign Application Priority Data

Jul. 13, 1993 [EP] European Pat. Off. .............. 93202153

[51] Int. Cl.⁶ .................. B32B 31/12; H01L 21/302; H01L 21/461
[52] U.S. Cl. .................... 156/153; 156/60; 156/281; 156/306.3; 437/225
[58] Field of Search ................ 156/60, 153, 306.3, 156/101, 281; 437/225, 946, 977; 148/716.12; 264/2.7

[56] References Cited

U.S. PATENT DOCUMENTS

| 4,003,538 | 1/1977 | Frye | 248/205.3 |
|---|---|---|---|
| 4,810,318 | 3/1989 | Ha-sma | 156/153 |
| 4,883,215 | 11/1989 | Goesele | 156/306.3 |
| 4,942,071 | 7/1990 | Frye | 248/205.3 |
| 4,956,015 | 9/1990 | Okajima | 51/308 |
| 5,284,803 | 2/1994 | Haisma | 148/DIG. 12 |
| 5,421,953 | 6/1995 | Nagakubo | 216/34 |

FOREIGN PATENT DOCUMENTS

| 0209173 | 1/1987 | European Pat. Off. . |
| 0383391 | 8/1990 | European Pat. Off. . |
| 4404931 | 8/1994 | Germany . |

OTHER PUBLICATIONS

J. Haisma et al, "Silicon–on–Insulator Wafer Bonding–Wafer Thinning Technology Evaluations", Japanese Journal of Applied Physics, vol. 28, No. 8, Aug. 1989, pp. 1426–1443.

*Primary Examiner*—Michael W. Ball
*Assistant Examiner*—Daniel J. Stemmer
*Attorney, Agent, or Firm*—Norman N. Spain

[57] ABSTRACT

A first object, which comprises organic material, is bonded to a second object by a method whereby both objects are provided with complementary optically smooth surfaces, subsequent to which these surfaces are brought into substantial contact with one another, consequent upon which spontaneous atomic bonds are formed between atoms of the two objects. The strength of the atomic bonds thus formed can be increased by subsequently heating the region of contact of the two surfaces.

19 Claims, No Drawings

METHOD OF BONDING TWO OBJECTS, AT LEAST ONE OF WHICH COMPRISES ORGANIC MATERIALS

BACKGROUND OF THE INVENTION

The invention relates to a method of bonding a first object, which comprises organic material, to a second object.

Such methods are well known from common experience, and may involve application of an adhesive substance to a surface of at least one of the two objects, subsequent to which this surface is held in contact with a complementary surface of the other object, whereby a chemical bond is formed between the two surfaces. Appropriate adhesive substances for this purpose are manifold, and include pastes, putties, cements, resins and glues, all demonstrating a wide range of chemical, mechanical, thermal, electrical and optical characteristics.

A disadvantage of these known methods is that they result in the permanent presence of a foreign substance (i.e. the adhesive substance) between the bonded surfaces of the two objects. Intended application of the objects in a precision device may thus place stringent demands on the characteristics of the adhesive substance used. For example, if the thermal expansivity of the adhesive substance is not carefully matched to that of the objects to be bonded, then exposure of the bonded objects to large or sudden changes in temperature may result in partial or complete severance of their bonded surfaces, due to the mechanical stresses arising from differential thermal expansion. Alternatively, application of the bonded objects in an ultra-high vacuum environment will necessitate use of an adhesive substance having a sufficiently low vapour pressure, so as to minimise outgassing. Furthermore, in applications requiring highly accurate mutual positioning of the two objects, such as the manufacture of integrated circuits or precision optics, allowances must be made for the thickness of the interfacial adhesive substance itself, especially since this will usually be inhomogeneous.

These considerations often necessitate the development of special adhesive substances for particular applications, at high cost. Such adhesive substances are often toxic and inflammable, so that care must be exercised both in their application and in their disposal. Moreover, many such adhesive substances contain solvents which can seriously degrade the surfaces of organic materials.

A further disadvantage of the known-methods is that they often do not provide an instant bond between the two objects. Rather, the objects must be held in motionless contact for an extended interval of time, so as to allow sufficient setting of the adhesive substance and consequent formation of an interfacial chemical bond between the objects. This extended interval of time may last up to several hours, and hinders bonding of the objects by rapid, continuous mass-production techniques. Furthermore, application of an adhesive substance in a production process requires special precautionary measures to avoid contamination of products and machinery by that substance.

SUMMARY OF THE INVENTION

It is an aim of the invention to provide a method of rapidly bonding two objects, at least one of which comprises organic material, without the necessity of introducing an adhesive substance at the interface between the objects.

According to the invention, this aim is achieved by a method which is characterised in that both objects are provided with complementary optically smooth surfaces, subsequent to which these surfaces are placed in substantial contact with one another, consequent upon which spontaneous atomic bonds are formed between atoms of the two objects.

The formation of spontaneous atomic bonds between objects comprising organic material is a surprising result. Although spontaneous atomic bonding (also called Direct Bonding) has been shown to occur between various inorganic materials, its extrapolation to organic materials is not self-evident, for a number of reasons. First, Direct Bonding is not only mediated by Van der Waals forces, but also by the formation of chemical OH bonds between the two contacted surfaces to be bonded. However, in contrast to inorganic materials, which are in many cases strongly hydrophillic, organic materials are often only weakly hydrophillic, or are hydrophobic. This character discourages the formation of OH bonds. Secondly, it has been shown that, in the case of objects of inorganic material provided with optically smooth surfaces and otherwise suitable for Direct Bonding, the storage of such objects in containers comprising organic material (such as plastic or rubber) makes the objects unsuitable for Direct Bonding. Only when all traces of organic material are removed from the surfaces to be bonded can the formation of spontaneous atomic bonds be achieved once again. In an article by Haisma et at. in Jap. J. Appl. Phys. 28 (8), pages 1426–1443 (1989), in particular pages 1429 and 1430, an elaborate procedure is elucidated for the thorough removal of organic materials from the surfaces of objects to be Direct Bonded. Thirdly, Direct Bonding of inorganic materials requires the surfaces which are to be bonded to have an average root-mean-square (RMS) roughness smaller than 2 nm, and preferably of the order of 0.5 nm. It is not immediately apparent that such degrees of optical smoothness can be achieved with the surfaces of organic materials.

European Patent Application EP-A-383391 elucidates a method of connecting two objects together on the basis of Direct Bonding. Complementary surfaces of the two objects are provided with an optically smooth finish, subsequent to which the surfaces are brought into local mutual contact so as to be non-parallel to one another, after which the objects are moved so that the contact becomes parallel, thus allowing formation of atomic bonds at the interface of the contacted surfaces. However, it is neither stated nor suggested in the document that the technique is applicable to bodies comprising organic material.

European Patent Specification EP-B-209173 describes a method for the manufacture of semiconductor devices which comprises the Direct Bonding of a support body to an electrically insulating layer provided on a semiconductor body. It is neither stated nor suggested in the document that the electrically insulating layer comprises organic material, and the only electrically insulating materials mentioned in the text are inorganic substances, such as silicon oxide.

It is a characteristic of the invention that the Direct Bonding of the two objects, at least one of which comprises organic material, occurs spontaneously. Using tribochemical polishing techniques, for example, it proves possible to provide both objects with an optically smooth surface of RMS roughness less than 2 nm. In order to form atomic bonds, the optically smooth surfaces of the objects need only be placed in contact with each other, or momentarily gently pressed against each other, without the need to clamp them together. Under these circumstances, a Direct Bond forms within seconds. If one of the objects is optically transparent, the process of Direct Bond formation can actually be seen, as steadily extending areas of the surfaces are drawn together into strongly bonded contact, excluding the thin air film between them. The bond energy of the bond thus formed can be measured using a standard knife-edge lifting technique, and the values thus found agree with the measured bond energy of Direct Bonds formed between inorganic materials.

DETAILED DESCRIPTION OF THE INVENTION

A plurality of various materials can be bonded together using the method according to the invention. For example, both the first and the second object which are to be bonded to one another can contain, or be wholly comprised of, organic material, which may be amorphous, monocrystalline or polycrystalline. In addition, the second object may contain, or be wholly comprised of, a semiconductor material, glass, metal or transparent electrical conductor. Examples of organic materials to which the method according to the invention can be applied include polymethylmethacrylate, polyimide and a polytetrafluorethylene sold under the trademark Teflon.

A preferred means for the provision of optically smooth surfaces on the objects to be bonded comprises tribochemical polishing. A particularly suitable range of polishing products for this purpose is furnished by Monsanto under the trade mark Syton™, and includes, for example, a suspension of $SiO_2$ nanograins in aqueous NaOH with a pH in the range 10–11, the approximate average size of the nanograins being 30 nm. Depending on the initial surface state of the objects to be bonded, the duration of such a tribochemical polishing procedure can lie in a range from a few minutes up to several hours, and may involve cyclic polishing, rinsing and drying stages. It is also possible to pre-polish the surfaces to be bonded, and then provide them with a final optically smooth finish using tribochemical polishing techniques. Although the surfaces to be bonded must be optically smooth and of complementary form, they need not have a flat geometry. For example, the method according to the invention can be employed to form an achromatic double lens by bonding a convex surface of one lens to a complementary concave surface of another lens, the two surfaces having the same radius of curvature.

Subsequent to formation of atomic bonds between the complementary optically smooth surfaces of the two objects, the strength of the bonds can be increased by subjecting the region of contact of the surfaces to heating. The increase of bond energy obtained in this manner can amount to two orders of magnitude, or more, depending on the particular duration and temperature of the heating process.

The invention and its attendant advantages will be further elucidated with the aid of a number of embodiments, described hereafter.

Embodiment 1

In experiments leading to the invention, two wafers of polymethylmethacrylate (PMMA), each of diameter 100 mm and thickness 3 mm, were subjected for several minutes to tribochemical polishing with a colloidal suspension of $SiO_2$ nanograins in NaOH solution. The average nanograin size was approximately 30 nm, and the pH of the solution was 10.3. Subsequent to polishing, the wafers were rinsed with de-ionised water, and dried.

When the flat surfaces of the wafers thus prepared were placed in contact with one another, a direct bond was seen to occur spontaneously at their interface. The bond energy of this bond was found to be 0.01 $J/m^2$.

In a subsequent experiment, a second such pair of Direct Bonded PMMA wafers was annealed for one hour at a temperature of 105° C. (being the glass transition temperature of PMMA). The bond energy of the Direct Bond was subsequently measured at room temperature, and was found to be 0.18 $J/m^2$. The annealing procedure therefore led to a strengthening of the Direct Bond.

A third such pair of Direct Bonded PMMA wafers was annealed for one hour at a temperature of 120° C., and the bond energy of the Direct Bond subsequently measured at room temperature, yielding a value of 1.2 $J/m^2$. The annealing treatment at this higher temperature therefore increased the Direct Bond strength to an even greater extent than the treatment described in the previous paragraph.

Embodiment 2

A rectangular block of polyimide measuring 20×20×3 $mm^3$ was glued to a flat-faced glass polishing holder in such a way that it presented an exposed 20×20 $mm^2$ surface parallel to the flat face of the polishing holder. This surface of the block was subsequently polished using a colloidal suspension of $SiO_2$ nanograins in KOH solution, after which the polishing holder with polyimide block were rinsed in de-ionised water, and dried.

A 10×5×0.5 $mm^3$ Si wafer was prepared using the wafer cleaning procedure described in section 4.2 of the above-cited article by Haisma et al. This wafer was then momentarily gently pressed on top of the polished face of the polyimide block, with a 5×10 $mm^2$ face turned downwards. A Direct Bond arose immediately at the interface of the polyimide and the Si.

Embodiment 3

A clean Si wafer was spin-coated on one side with a thin layer of TEFLON. A fused silica wafer was prepared using the wafer cleaning procedure described in section 4.2 of the above-cited article by Haisma et al. This latter wafer was then placed face-down on the TEFLON layer, and momentarily gently pressed against it. A Direct Bond quickly arose at the interface of the TEFLON and the fused silica.

Embodiment 4

A flat tantalum plate measuring 50×50×1 $mm^3$ was cyclically tribochemically polished with Syton™ HT50 for a total of three hours, after which it was rinsed with de-ionised water, and dried. A circular PMMA wafer of diameter 100 mm and thickness 3 mm was polished, rinsed and dried as described in Embodiment 1. The polished faces of the plate and wafer were then brought into contact, causing a Direct Bond to arise at their interface.

Embodiment 5

One of the circular faces of a ring of monocrystalline Ferroxcube (a Mn-Zn ferrite) was tribochemically polished to an RMS roughness of approximately 1 nm, rinsed in de-ionised water, dried, and ozone-cleaned. The ring had an outer diameter of 35 mm, an inner diameter of 10 mm and a thickness of 1 mm.

A PMMA wafer of diameter 100 mm and thickness 3 mm was polished, rinsed and dried as described in Embodiment 1. The polished faces of the PMMA wafer and the Ferroxcube ring were subsequently brought into contact, causing a Direct Bond to arise at their interface.

Embodiment 6

One of the circular faces of a ring of polycrystalline permanent magnetic Ba ferrite was tribochemically polished to an RMS roughness of 2 nm, rinsed in de-ionised water, dried, and ozone-cleaned. The ring had an outer diameter of 30 mm, an inner diameter of 15 mm, and a thickness of 3 mm.

A PMMA wafer of diameter 100 mm and thickness 3 mm was polished, rinsed and dried as described in Embodiment 1. The polished faces of the PMMA wafer and the ferrite ring were subsequently brought into contact, causing a Direct Bond to arise at their interface.

Embodiment 7

A flat Si wafer of diameter 100 mm and nominal thickness 525 μm was tribochemically polished to an RMS roughness of 0.5 nm, and cleaned in the manner described for the Si wafer in Embodiment 2. When placed flat upon the polished surface of such a PMMA wafer as described and prepared in Embodiment 1, a Direct Bond quickly arose at the interface of the Si and the PMMA.

Embodiment 8

A flat fused silica wafer of diameter 100 mm and nominal thickness 525 μm was tribochemically polished to an RMS roughness of 0.5 nm, and cleaned in the same manner described for the fused silica wafer in Embodiment 3. When placed flat upon the polished surface of such a PMMA wafer as described and prepared in Embodiment 1, a Direct Bond arose at the interface of the fused silica and the PMMA.

Embodiment 9

The inventive method can be used as follows in the manufacture of a sensitive mechanical deformation sensor, exploiting the well-known piezoresistive effect in Si:

(a) Using integrated circuit technology, an insulated polycrystalline resistor network can be made on top of a wafer of, for example, monocrystalline Si;

(b) The said wafer is next reduced in thickness, e.g. using a grinding and subsequent polishing/etching procedure. The final wafer thickness is preferably <100 μm, so as to ensure sufficient flexibility;

(c) The wafer is subsequently direct-bonded to a smooth face of a thin sheet of flexible organic material (e.g. a polymer) using the method according to the invention. Thanks to the intimacy of the resulting direct bond, any mechanical deformation experienced by the organic sheet will also be felt by the Si wafer and by the resistor network located thereupon. The composition and thickness of the particular organic sheet used can be chosen in accordance with the flexibility (sensitivity) requirements of the final sensor;

(d) The resulting wafer/organic sandwich can now be sawed into smaller "chips" (if so desired), thus forming miniature sensor elements;

(e) Such a sensor element is next appropriately mounted on a test body, e.g. by spanning it across the gap between two support pillars, attaching it to the surface of a torsional axle, etc. Slight mechanical deformations of the test body (e.g. translational or rotational displacement, vibration, stretch, etc.) will then be transferred to the sensor element, causing electrical resistance changes in the resistor network on top of the Si wafer via the piezoresistive effect. These resistance changes can be monitored via fine contact leads attached to appropriate locations on the resistor network.

We claim:

1. A method of bonding a first object having a surface consisting essentially of an organic material to a second object, said method comprising polishing said surface consisting essentially of an organic material and a surface of said second object so as to form optically smooth complementary surfaces of RMS roughness of less than 2nm and then bringing said surfaces into contact with each other thereby spontaneously forming atomic bonds between atoms of said surfaces and causing said surfaces to bond one to the other.

2. A method as claimed in claim 1, characterised in that the organic material comprises a polymer.

3. A method as claimed in claim 2, characterised in that the organic material is selected from the group consisting of polymethylmethacryiate, polyimide and polytetrafluoroethylene.

4. A method as claimed in claim 3, characterized in that the second object comprises an organic material.

5. A method as claimed in claim 3, characterized in that the second object comprises glass.

6. A method as claimed in claim 2, characterized in that the second object comprises an organic material.

7. A method as claimed in claim 2, characterized in that the second object comprises a semiconductor material.

8. A method as claimed in claim 2, characterized in that the second object comprises glass.

9. A method as claimed in claim 2, characterized in that the second object comprises an electrical conductor.

10. A method as claimed in claim 2, characterized in that the complementary optically smooth surfaces are provided by a procedure which comprises tribochemical polishing.

11. A method as claimed in claim 1, characterised in that the second object comprises an organic material.

12. A method as claimed in claim 1, characterised in that the second object comprises a semiconductor material.

13. A method as claimed in claim 1, characterised in that the second object comprises glass.

14. A method as claimed in claim 1, characterised in that the second object comprises an electrical conductor.

15. A method as claimed in claim 1, characterised in that the complementary optically smooth surfaces are provided by a procedure which comprises tribochemical polishing.

16. A method of claim 1 wherein the first object consists essentially of an organic material.

17. The method of claim 16 wherein the organic material is a polymer.

18. A method of claim 1 wherein, after formation of the atomic bonds, heat is applied to said surfaces at a region of contact between said surfaces.

19. A method as claimed in claim 18, characterized in that the organic material is selected from the group consisting of polymethylmethacrylate polyimide and polytetrafluoroethylene.

* * * * *